United States Patent
Hashimoto et al.

(10) Patent No.: US 8,616,835 B2
(45) Date of Patent: Dec. 31, 2013

(54) GAS TURBINE

(75) Inventors: Shinya Hashimoto, Hyogo-ken (JP); Kenichi Arase, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 611 days.

(21) Appl. No.: 12/933,636

(22) PCT Filed: Jan. 8, 2009

(86) PCT No.: PCT/JP2009/050134
§ 371 (c)(1),
(2), (4) Date: Sep. 20, 2010

(87) PCT Pub. No.: WO2009/119126
PCT Pub. Date: Oct. 1, 2009

(65) Prior Publication Data
US 2011/0020116 A1    Jan. 27, 2011

(30) Foreign Application Priority Data
Mar. 28, 2008 (JP) ................... 2008-088749

(51) Int. Cl.
*F01D 25/14* (2006.01)
(52) U.S. Cl.
USPC ................................ 415/142; 415/175
(58) Field of Classification Search
USPC ............... 415/108, 142, 175, 176, 177, 178
See application file for complete search history.

(56) References Cited

U.S. PATENT DOCUMENTS

| | | | |
|---|---|---|---|
| 2,616,662 A * | 11/1952 | Mierley | ............ 60/200.1 |
| 2,933,893 A | 4/1960 | Blyth et al. | |
| 4,987,736 A | 1/1991 | Ciokajlo et al. | |
| 7,373,773 B2 | 5/2008 | Noda | |
| 7,410,343 B2 | 8/2008 | Wakazono et al. | |
| 2002/0121082 A1 | 9/2002 | Hashimoto et al. | |
| 2005/0050898 A1 * | 3/2005 | Noda | ............ 60/772 |

FOREIGN PATENT DOCUMENTS

| | | |
|---|---|---|
| CN | 1207454 A | 2/1992 |
| EP | 1180577 A2 | 2/2002 |
| JP | 59173527 A | 10/1984 |
| JP | 02-218824 A | 8/1990 |
| JP | 2003-314299 A | 11/2003 |
| JP | 2004-052598 A | 2/2004 |
| JP | 2004-190664 A | 7/2004 |

(Continued)

OTHER PUBLICATIONS

Office Action for Chinese Application No. 200980110175.5 issued Dec. 14, 2012.

(Continued)

*Primary Examiner* — Richard Edgar
(74) *Attorney, Agent, or Firm* — Lowe Hauptman & Ham, LLP (57) ABSTRACT

A gas turbine including exhaust chamber defined by a cylindrical casing wall and a bearing case that supports a bearing part of a rotor in the casing wall, struts provided at equal intervals in circumferential direction of the bearing case and extending in tangential direction of the bearing case to couple the casing wall and the bearing case, a diffuser unit having an outer diffuser at the inner periphery of the casing wall and an inner diffuser at the outer periphery of the bearing case, a cooling chamber in which the outer diffuser and the inner diffuser are coupled by a strut cover, led to a portion between the casing wall and the outer diffuser, a portion between the bearing case and the inner diffuser, and the insides of the strut cover, and a partition wall that covers the outer periphery of the bearing case.

2 Claims, 6 Drawing Sheets

(56) References Cited

FOREIGN PATENT DOCUMENTS

JP    2005-083199 A    3/2005
JP    2007-192028 A    8/2007

OTHER PUBLICATIONS

Notice of Allowance corresponding to KR 10-2010-7020926, dated Jul. 6, 2012.

ISR for PCT/JP2009/050134 mailed Feb. 17, 2009.

Notification of Grant of Invention Patent mailed Aug. 26, 2013 corresponds to Chinese patent application No. 200980110175.5.

Notification of Completion of Formalities for Registration mailed Aug. 26, 2013 corresponds to Chinese patent application No. 200980110175.5.

\* cited by examiner

GAS TURBINE

RELATED APPLICATIONS

The present application is a national phase of International Application Number PCT/JP2009/050134 filed Jan. 8, 2009, and claims priority from Japanese Patent Application Number 2008-088749, filed Mar. 28, 2008.

TECHNICAL FIELD

The present invention relates to a gas turbine. More specifically, the present invention relates to a gas turbine for cooling an exhaust unit of a turbine.

BACKGROUND ART

A gas turbine includes a compressor, a combustor, and a turbine. The compressor generates high-temperature and high-pressure compressed air, by compressing air taken in from an air inlet. The combustor generates high-temperature and high-pressure combustion gas by supplying fuel to the compressed air and burning it. The turbine includes a plurality of turbine vanes and turbine rotor blades alternatively arranged in a casing. For example, a rotor coupled to a generator is rotatably driven because the combustion gas supplied to an exhaust passage drives the turbine rotor blades. The combustion gas used to drive the turbine is converted into static pressure by a diffuser, and released to the atmosphere.

In such a gas turbine, the temperature of the combustion gas for driving the turbine is increased with high efficiency. Accordingly, almost all components of the turbine must be cooled, and the diffuser that is an exhaust unit of the turbine must also be cooled.

For example, Patent Document 1 discloses a conventional gas turbine for cooling a diffuser. This gas turbine includes an exhaust casing including an outer peripheral casing and an inner peripheral casing connected to the downstream side of a turbine. Struts are formed between the inner peripheral casing and the outer peripheral casing. Diffusers are provided at the outer peripheral side and the inner peripheral side of the exhaust casing, and an exhaust plenum including a strut cover for covering each of the struts and coupling the diffusers is provided. A first cooling system that supplies cooling air into the exhaust plenum, from the outer peripheral side of an outer peripheral diffuser to the inner peripheral side of an inner peripheral diffuser, through the inside of the strut cover, and a second cooling system that supplies cooling air along the inner peripheral diffuser at the further inner peripheral side of the inner peripheral diffuser are provided.

In this gas turbine disclosed in Patent Document 1, for example, as a gas turbine disclosed in Patent Document 2, the inner peripheral casing is supported by the outer peripheral casing by struts, and the struts are extendedly provided in the radial direction around the axial center of the rotor. A bearing part of the rotor is supported in the inner peripheral casing. In other words, in the gas turbines disclosed in Patent Document 1 and Patent Document 2, the rotor is supported by the inner peripheral casing, and the inner peripheral casing is supported by the outer peripheral casing by the struts. Accordingly, the outer peripheral casing, the inner peripheral casing, and the struts are formed as a rigid structure. Consequently, to maintain the position of the rotor in the gas turbine disclosed in Patent Document 1, the expansion of the outer peripheral casing, the inner peripheral casing, and the struts due to the heat of combustion gas must be prevented by cooling the outer peripheral casing, the inner peripheral casing, and the struts to a uniform temperature, with such cooling performed by the first cooling system and the second cooling system.

For example, in a gas turbine disclosed in Patent Document 3, a bearing case in a tubular shape for supporting the bearing part of the rotor is provided instead of the inner peripheral casing in Patent Document 1. A plurality of struts extending in the tangential direction of the bearing case is formed between the bearing case and the outer peripheral casing (casing wall), at equal intervals in the circumferential direction of the bearing case. In the gas turbine, the position of the rotor is maintained even if the struts are expanded or contracted by the changes in temperature because the bearing case rotates about the axial center of the rotor. Diffusers of the gas turbine disclosed in Patent Document 3 are provided at the inner side of the outer peripheral casing and at the outer peripheral side of the bearing case. The diffusers are coupled by a strut cover used to cover each of the struts, and a cooling chamber linked to the strut cover is formed at the outer peripheral side and the inner peripheral side of the diffusers.

[Patent Document 1] Japanese Patent Application Laid-open No. 2005-83199
[Patent Document 2] Japanese Patent Application Laid-open No. 2003-314299
[Patent Document 3] Japanese Patent Application Laid-open No. 2007-192028

DISCLOSURE OF INVENTION

Problem to be Solved by the Invention

In the gas turbine disclosed in Patent Document 3, diffusers are cooled by cooling air supplied into the cooling chamber. However, if the diffusers are exposed to high-temperature combustion gas, the temperature of the cooling air is increased, and the temperature increase affects the bearing case. Accordingly, the temperature of lubricating oil supplied to the bearing part is also increased in the bearing case. If the lubricity of the lubricating oil is impaired by the temperature increase, the bearing performance may be reduced.

The present invention has been devised in view of the circumstances above, and an object of the present invention is to provide a gas turbine capable of preventing a rotor bearing part from being heated due to the temperature increase of cooling air used to cool a diffuser unit and struts of the turbine.

Means for Solving Problem

According to an aspect of the present invention, a gas turbine includes: a casing wall in a cylindrical shape that forms an outer shell of a downstream side of a turbine; a bearing case that supports a bearing part of a rotor in the casing wall; a plurality of struts that are provided in a circumferential direction of the bearing case and extend in a tangential direction of the bearing case to couple the casing wall and the bearing case; a diffuser unit that includes an outer diffuser provided along an inner periphery of the casing wall and an inner diffuser provided along an outer periphery of the bearing case; a partition wall that is formed between the bearing case and the inner diffuser and covers the outer periphery of the bearing case; and a cooling chamber in which the outer diffuser and the inner diffuser are coupled by a strut cover for covering each of the struts, and that is led to a portion between the casing wall and the outer diffuser, a portion between the partition wall and the inner diffuser, and an inside of the strut cover. The partition wall has the struts penetrating therethrough and isolates cooling medium in the cooling chamber from cooling medium around the bearing case.

Heat exchange is carried out while the cooling air flows through the outer diffuser, the strut cover, and the inner diffuser. By the time the cooling air reaches the inner diffuser, the temperature of the cooling air is increased, so as to heat the lubricating oil of the bearing in the bearing case. In the gas turbine of the present invention, cooling air is prevented from flowing to the side of the bearing case by providing the partition wall. As a result, it is possible to cool the inner and outer diffusers, the strut covers, and the struts, and it is also possible to prevent the temperature of the bearing part of the rotor from being increased by the cooling air whose temperature has risen.

By providing the partition wall, a space in which the bearing case is accommodated can be independently ventilated. It is also possible to independently manage the amount of ventilation air around the bearing case and the amount of cooling air in the cooling chamber.

Advantageously, the gas turbine further includes a partition wall supporting member one end side of which is fixed to the bearing case and another end side of which is fixed to the partition wall, that is provided in an extending direction of each of the struts, and that includes a sealing unit dividing the one end side and the other end side, and that is slidably provided in the extending direction of the struts, while maintaining airtightness between the one end side and the other end side.

In the gas turbine, the struts are extendedly provided in the tangential direction of the bearing case. Accordingly, even if the struts are expanded or contracted by the changes in temperature, the position of the rotor is maintained because the bearing case rotates about the axial center of the rotor. Relative to such expansion and contraction of the struts, one end side and the other end side of the partition wall supporting member are movably provided relative to the extending direction of the struts, and the partition wall follows the expansion and contraction of the struts. Accordingly, the position of the partition wall is maintained.

The gas turbine of the present invention includes the partition wall supporting member that surrounds the outer periphery of each of the struts, one end side of the supporting member is fixed to the partition wall and the other end side is fixed to the casing wall, with the supporting member provided in the extending direction of the struts.

In the gas turbine, the struts are extendedly provided in the tangential direction of the bearing case. Accordingly, even if the struts are expanded or contracted by the changes in temperature, the position of the rotor is maintained because the bearing case rotates about the axial center of the rotor. Relative to such expansion and contraction of the struts, the supporting member surrounding the outer periphery of each of the struts follows the expansion and contraction of the struts. Accordingly, the position of the partition wall is maintained.

Effect of the Invention

With the present invention, it is possible to prevent the bearing in the bearing case from being heated due to the temperature increase of cooling air used to cool the diffuser unit and the struts of the turbine.

EXPLANATIONS OF LETTERS OR NUMERALS

1 compressor
2 combustor
3 turbine
34 exhaust chamber
4 rotor
41, 42 bearing part
51 casing wall
52 bearing case
53 strut
53a strut cover
54 diffuser unit
54a outer diffuser
54b inner diffuser
55 cooling chamber
56 partition wall
57, 58 partition wall supporting member
57a, 58a one end side
57b, 58b other end side
57c sealing unit
59 exhaust tunnel
R axial center Best Mode(s) for Carrying out the Invention Exemplary embodiments of a gas turbine according to the present invention will be described below in greater detail with reference to the accompanying drawings. However, the present invention is not limited to the embodiments.

Figure 1:
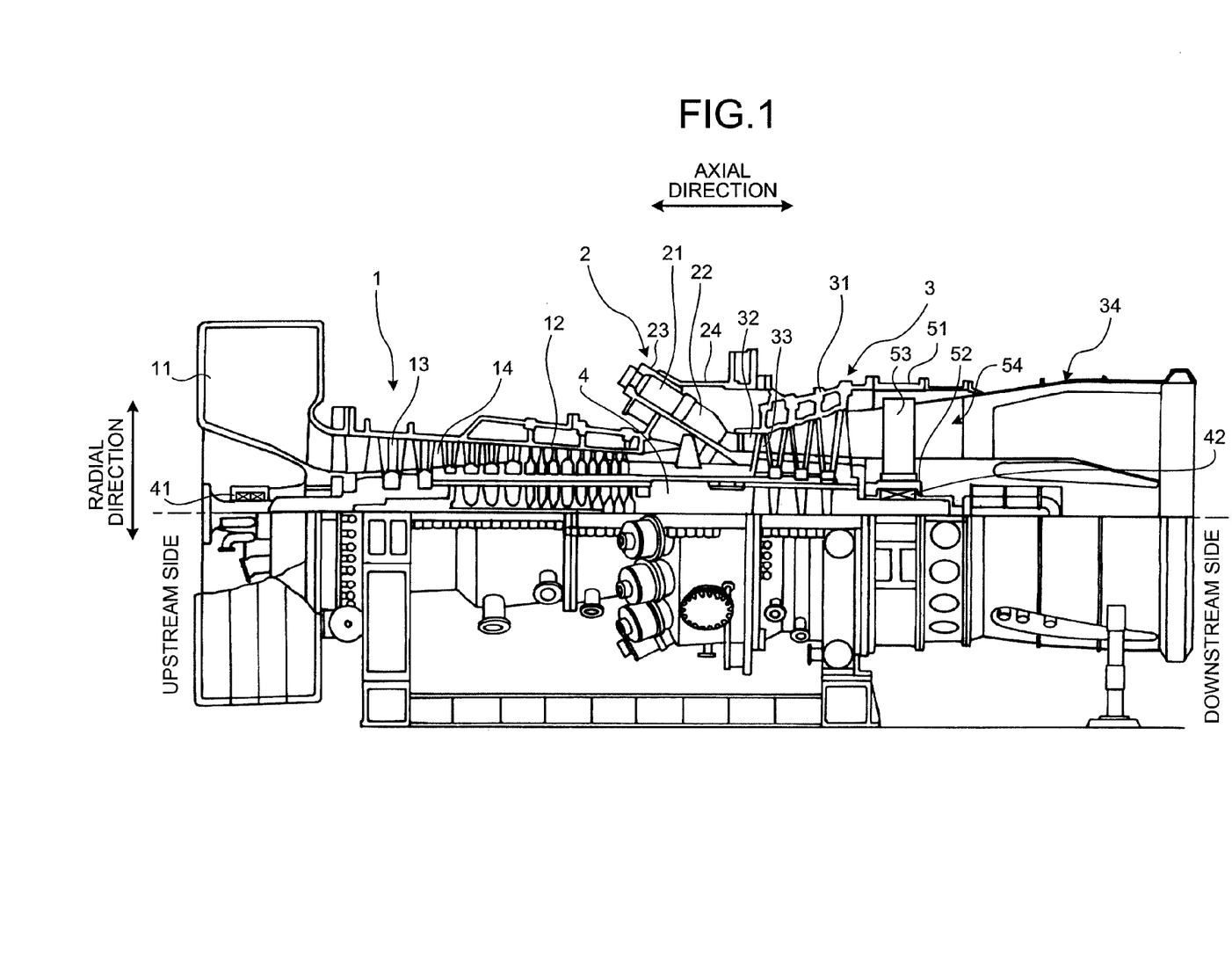
FIG. 1 is a schematic of a gas turbine according to an embodiment of the present invention.
Figure 2:
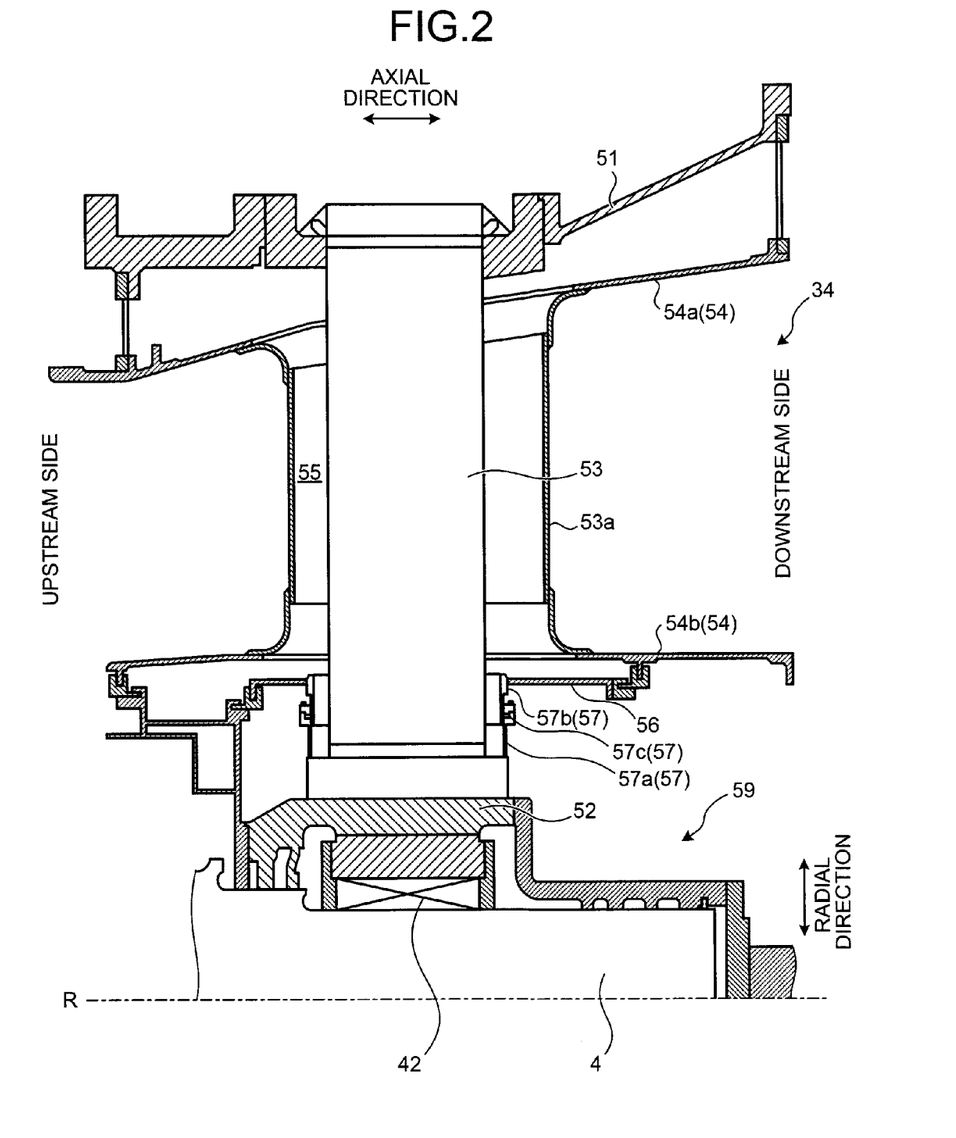
FIG. 2 is a schematic of the downstream side of a turbine of the gas turbine illustrated in FIG. 1.
Figure 3:
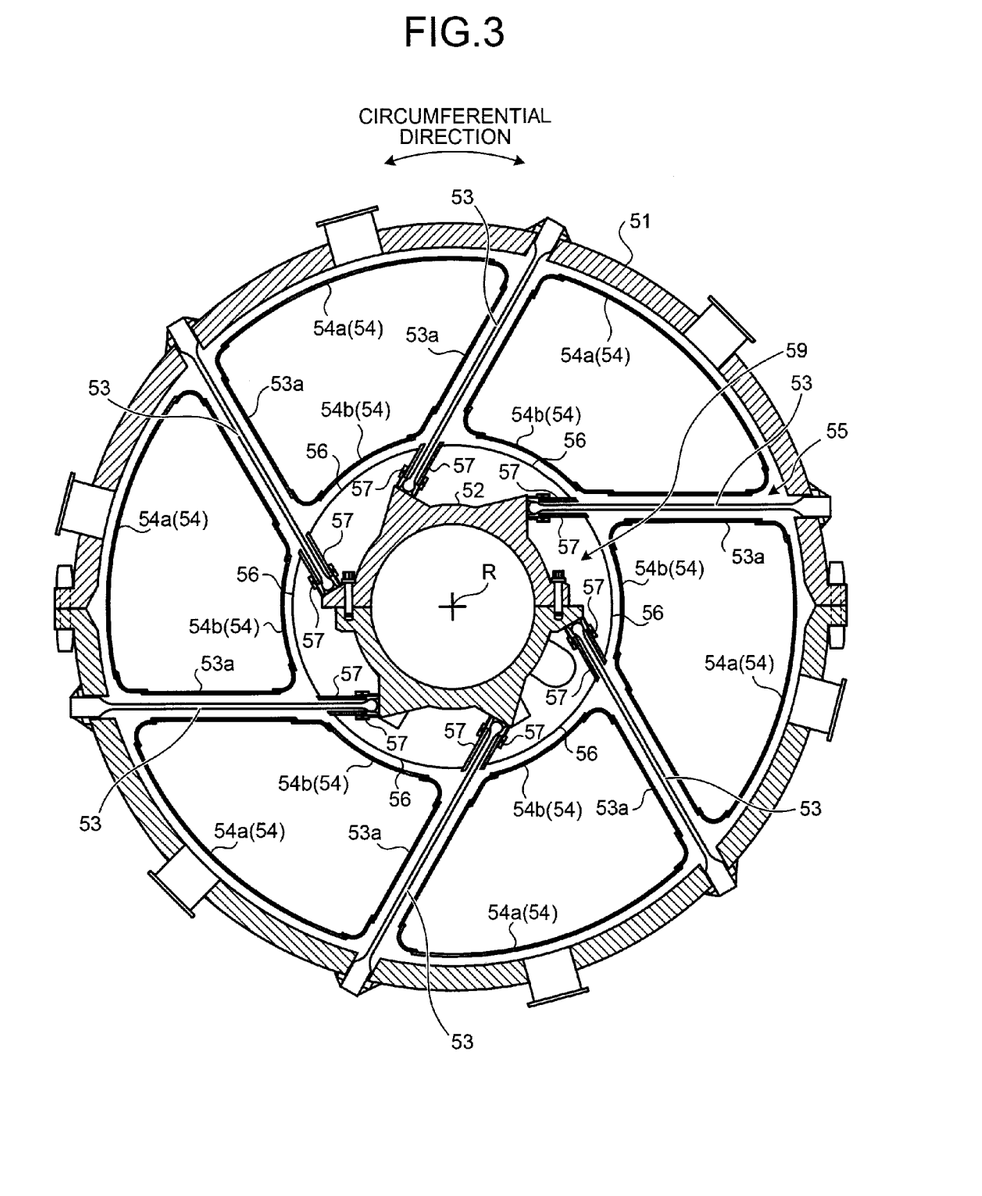
FIG. 3 is a schematic of the downstream side of the turbine illustrated in FIG. 2, when viewed from the axial direction.
Figure 4:
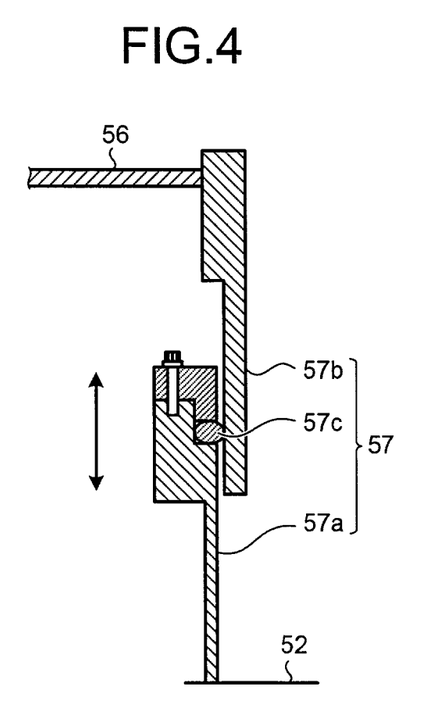
FIG. 4 is a schematic of a partition wall supporting member.

FIG. 1 is a schematic of a gas turbine according to an embodiment of the present invention. FIG. 2 is a schematic of the downstream side of a turbine of the gas turbine illustrated in FIG. 1. FIG. 3 is a schematic of the downstream side of the turbine illustrated in FIG. 2, when viewed from the axial direction. FIG. 4 is a schematic of a partition wall supporting member.

The gas turbine, as illustrated in FIG. 1, includes a compressor 1, a combustor 2, and a turbine 3. A rotor 4 is disposed so as to penetrate through the center portions of the compressor 1, the combustor 2, and the turbine 3. The compressor 1, the combustor 2, and the turbine 3 are arranged side by side in this order, along an axial center R of the rotor 4, from the upstream side to the downstream side of the flow of air or combustion gas. In the following explanation, the axial direction is a direction parallel to the axial center R, the circumferential direction is a direction around the axial center R, and the radial direction is a direction perpendicular to the axial center R.

The compressor 1 generates compressed air by compressing air. The compressor 1 includes compressor vanes 13 and compressor rotor blades 14 in a compressor casing 12 in which an air inlet 11 to draw in air is formed. The compressor vanes 13 are fixed at the side of the compressor casing 12, and arranged side by side in plurality in the circumferential direction. The compressor rotor blades 14 are fixed at the side of the rotor 4, and arranged side by side in plurality in the circumferential direction. The compressor vanes 13 and the compressor blades 14 are alternately arranged in the axial direction.

The combustor 2 generates high-temperature and high-pressure combustion gas by supplying fuel to the compressed air compressed by the compressor 1. The combustor 2 includes an inner cylinder 21 that is a combustion cylinder for mixing the compressed air with fuel and burning the mixture, a transition piece 22 that guides the combustion gas from the inner cylinder 21 to the turbine 3, and an outer casing 23 that covers the outer periphery of the inner cylinder 21 and guides the compressed air from the compressor 1 to the inner cylinder 21. The combustor 2 is arranged side by side in plurality (such as 16 pieces) in the circumferential direction of a combustor casing 24.

The turbine 3 generates rotational power from the combustion gas burned in the combustor 2. The turbine 3 includes turbine vanes 32 and turbine rotor blades 33 in a turbine casing 31. The turbine vanes 32 are fixed at the side of the turbine casing 31 and arranged side by side in plurality in the circumferential direction. The turbine rotor blades 33 are fixed at the outer periphery of a disk that rotates about the axial center R of the rotor 4, and arranged side by side in plurality in the circumferential direction. The turbine vanes 32 and the turbine rotor blades 33 are alternately arranged in the axial direction. An exhaust chamber 34 that includes a diffuser unit 54 continued to the turbine 3 is formed at the downstream side of the turbine casing 31.

An end of the rotor 4 at the side of the compressor 1 is supported by a bearing part 41, and an end of the rotor 4 at the side of the exhaust chamber 34 is supported by a bearing part 42. The rotor 4 is rotatably provided about the axial center R. A driving shaft of a generator (not illustrated) is coupled to the end of the rotor 4 at the side of the exhaust chamber 34.

In such a gas turbine, air drawn in from the air inlet 11 of the compressor 1 is converted into high-temperature and high-pressure compressed air by being compressed as it passes passing through the compressor vanes 13 and the compressor rotor blades 14. High-temperature and high-pressure combustion gas is generated by supplying fuel to the compressed air from the combustor 2. The rotor 4 is rotatably driven because the combustion gas passes through the turbine vanes 32 and the turbine rotor blades 33 of the turbine 3. Electricity is generated by applying rotational power to the generator coupled to the rotor 4. The combustion gas used to rotate and drive the rotor 4 is converted into static pressure by the diffuser unit 54 in the exhaust chamber 34, and released to the atmosphere.

In the gas turbine, the exhaust chamber 34 at the downstream side of the turbine 3, as illustrated in FIGS. 2 and 3, is defined by a casing wall 51 in a cylindrical shape that forms the outer shell, and a bearing case 52 in a cylindrical shape that is accommodated in the casing wall 51 and that supports the bearing part 42 of the rotor 4.

The exhaust chamber 34 includes struts 53 for coupling the casing wall 51 and the bearing case 52. The struts 53 are provided in plurality (six in the present embodiment) at equal intervals in the circumferential direction of the bearing case 52. The struts 53 are extendedly provided in the tangential direction of the bearing case 52. In other words, the bearing case 52, in which the bearing part 42 of the rotor 4 is accommodated, is supported by the casing wall 51 through the struts 53. Even if the struts 53 are expanded by being heated by combustion gas that passes through the exhaust chamber 34 during the operation performed by the gas turbine, or even if the cooled struts 53 are contracted when the gas turbine is stopped, the position of the rotor 4 is maintained because the bearing case 52 rotates about the axial center R of the rotor 4 with the expansion and contraction of the struts 53.

The exhaust chamber 34 includes the diffuser unit 54. The diffuser unit 54 includes an outer diffuser 54a provided along the inner periphery of the casing wall 51, and an inner diffuser 54b provided along the outer periphery of the bearing case 52. The struts 53 are disposed so as to penetrate through the outer diffuser 54a and the inner diffuser 54b. The outer diffuser 54a and the inner diffuser 54b are coupled by a flexible strut cover 53a used to cover each of the struts 53. Accordingly, a cooling chamber 55 leading to a portion between the casing wall 51 and the outer diffuser 54a, a portion between the bearing case 52 and the inner diffuser 54b, and the inside of the strut covers 53a is defined.

In the above structure, a partition wall 56 for covering the outer periphery of the bearing case 52 is formed between the bearing case 52 and the inner diffuser 54b. The upstream side end and the downstream side end of the partition wall 56 in the axial direction, are connected to the inner diffuser 54b interposing a seal member therebetween, thereby blocking the cooling chamber 55 with the inside of the inner diffuser 54b. In other words, the partition wall 56 isolates the bearing case 52 from the cooling chamber 55. The struts 53 are provided so as to penetrate through the partition wall 56.

The partition wall 56 is supported by a partition wall supporting member 57 in the exhaust chamber 34. The partition wall supporting member 57 is formed in a tubular shape so as to surround the outer periphery of the end of the struts 53 fixed at the side of the bearing case 52. One end side 57a of the partition wall supporting member 57 opened in a tubular shape is fixed to the bearing case 52. Another end side 57b of the partition wall supporting member 57 opened in a tubular shape is fixed to the partition wall 56 along a portion through which the strut 53 penetrates.

As illustrated in FIG. 4, the one end side 57a and the other end side 57b of the partition wall supporting member 57 are divided, and the one end side 57a overlaps with the outer periphery of the other end side 57b at the divided portion. A sealing unit 57c is provided at the divided portion. The sealing unit 57c is interposed at a portion where the one end side 57a and the other end side 57b are overlapped with each other, and formed in a ring shape along the periphery of the tubular partition wall supporting member 57. Accordingly, airtightness is maintained between the one end side 57a and the other end side 57b. The sealing unit 57c is slidably provided while maintaining the airtightness, thereby allowing the relative movement of the one end side 57a and the other end side 57b in the extending direction (direction of arrow in FIG. 4) of the strut 53.

In such an exhaust chamber 34 at the downstream side of the turbine 3, the combustion gas used to rotate and drive the rotor 4 passes through the diffuser unit 54, in other words, between the outer diffuser 54a and the inner diffuser 54b, and is converted into static pressure. The temperature of the diffuser unit 54 is increased by being heated by the combustion gas. Accordingly, the diffuser unit 54 and the struts 53 are cooled, by sending cooling air into the cooling chamber 55 by a cooling fan (not illustrated) provided at the outside of the casing wall 51, and introducing the cooling air through the outer diffuser 54a, the strut cover 53a, and the inner diffuser 54b. The cooling air is discharged into the exhaust chamber 34, after flowing between the partition wall 56 and the inner diffuser 54b.

Heat exchange is carried out while the cooling air flows through the outer diffuser 54a, the strut cover 53a, and the inner diffuser 54b. By the time the cooling air reaches the inner diffuser 54b, the temperature of the cooling air is increased so as to heat the lubricating oil of the bearing part 42 in the bearing case 52. In the gas turbine according to the present embodiment, the cooling air used to cool the inner diffuser 54b is prevented from flowing to the side of the bearing case 52, by providing the partition wall 56 that isolates the inner diffuser 54b from the bearing case 52. As a result, the diffuser unit 54, the strut 53, and the strut cover 53a are cooled, thereby preventing the bearing part 42 of the rotor 4 from being heated by the cooling air whose temperature has risen.

Ventilation air is supplied to an exhaust tunnel 59 formed between the bearing case 52 and the partition wall 56, from the downstream side of the gas turbine. The ventilation air prevents the temperature of the bearing case 52 from being excessively increased. The ventilation air is then discharged into the exhaust chamber 34, as the cooling air.

It is possible to independently ventilate a space in which the bearing case 52 is accommodated, by providing the partition wall 56. It is also possible to independently manage the amount of ventilation air around the bearing case 52 and the amount of cooling air in the cooling chamber.

In the gas turbine according to the present embodiment, the struts 53 are extendedly provided in the tangential direction of the bearing case 52. Accordingly, even if the struts 53 are expanded or contracted by the changes in temperature, the position of the rotor 4 is maintained because the bearing case 52 rotates about the axial center R of the rotor 4. Relative to such expansion and contraction of the struts 53, the one end side 57a and the other end side 57b of the partition wall supporting member 57 are movably provided relative to the extending direction of the strut 53, and the partition wall 56 follows the expansion and contraction of the struts 53. Accordingly, the position of the partition wall 56 is maintained. Because the flexible strut cover 53a is bent, the diffuser unit 54 follows the expansion and contraction of the struts 53, thereby maintaining the position of the diffuser unit 54.

In the conventional gas turbines disclosed in Patent Document 1 and Patent Document 2 described above, a partition wall is to be disposed between the inner peripheral diffuser and the inner peripheral casing to provide the partition wall 56 as the gas turbine according to the present embodiment. However, to obtain a space for accommodating the partition wall, the inner peripheral diffuser must be moved outward, or the design must be changed to accommodate the partition wall by reducing the thickness of the inner peripheral casing. If the inner peripheral diffuser is moved outward, a space between the inner peripheral diffuser and the outer peripheral diffuser is reduced, thereby increasing the flow velocity at an outlet portion from which combustion gas is released to the atmosphere. Accordingly, the pressure loss at the outlet portion is increased. If the outer peripheral diffuser is also moved outward, the size of the gas turbine is increased. If the thickness of the inner peripheral casing is reduced, the strength of the inner peripheral casing is reduced. In the conventional gas turbines disclosed in Patent Document 1 and Patent Document 2, the outer peripheral casing, the inner peripheral casing, and the struts must be formed in a rigid structure. Consequently, if the rigidity of the inner peripheral casing is reduced, the strength of the outer peripheral casing and the struts must be changed.

On the other hand, in the gas turbine according to the present embodiment, the partition wall 56 can be provided in the structure in which the struts 53 are extendedly provided in the tangential direction of the bearing case 52, without changing the basic design of the structure and without reducing the strength or effect.

Figure 5:
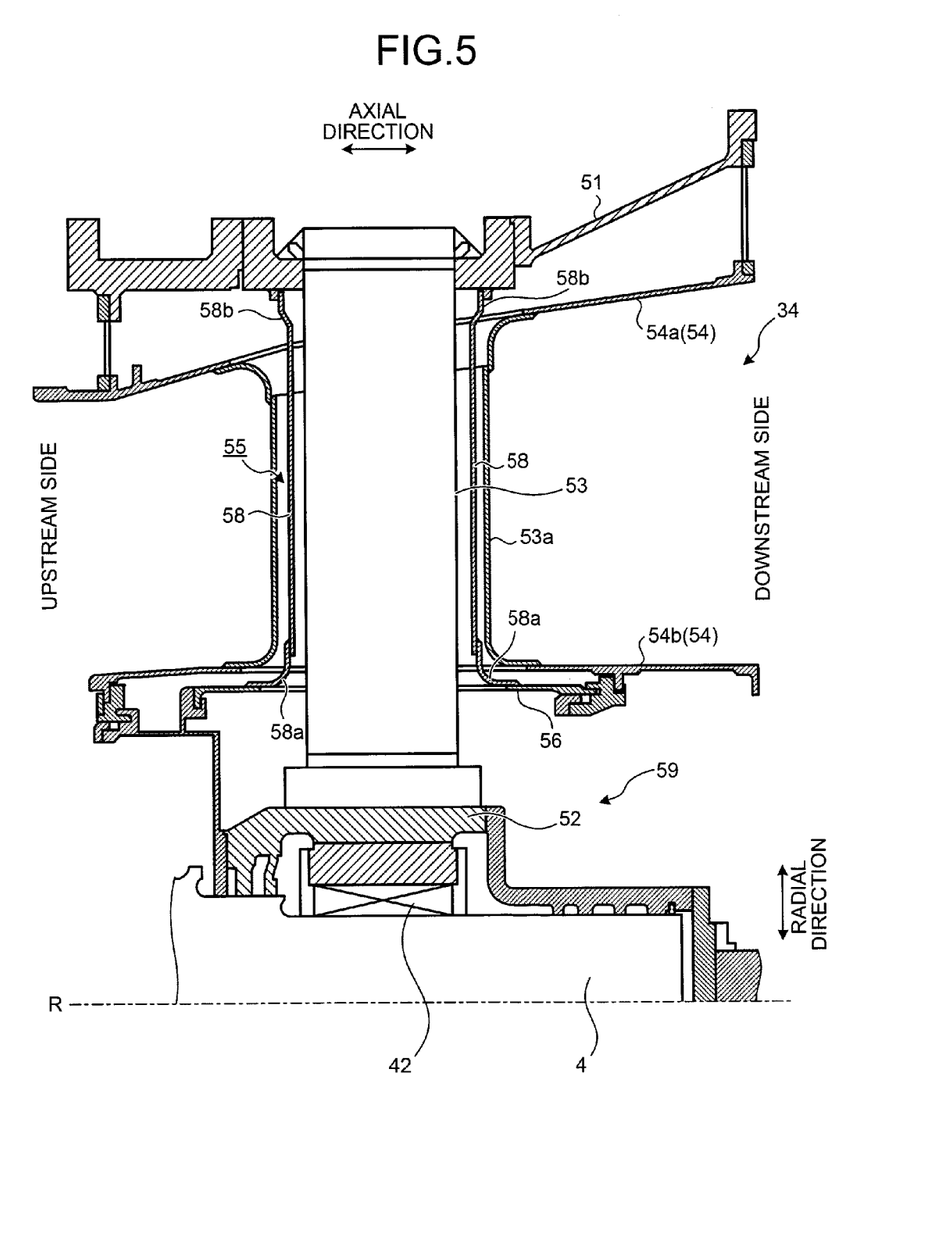
FIG. 5 is another schematic of the downstream side of the turbine of the gas turbine illustrated in FIG. 1.
Figure 6:
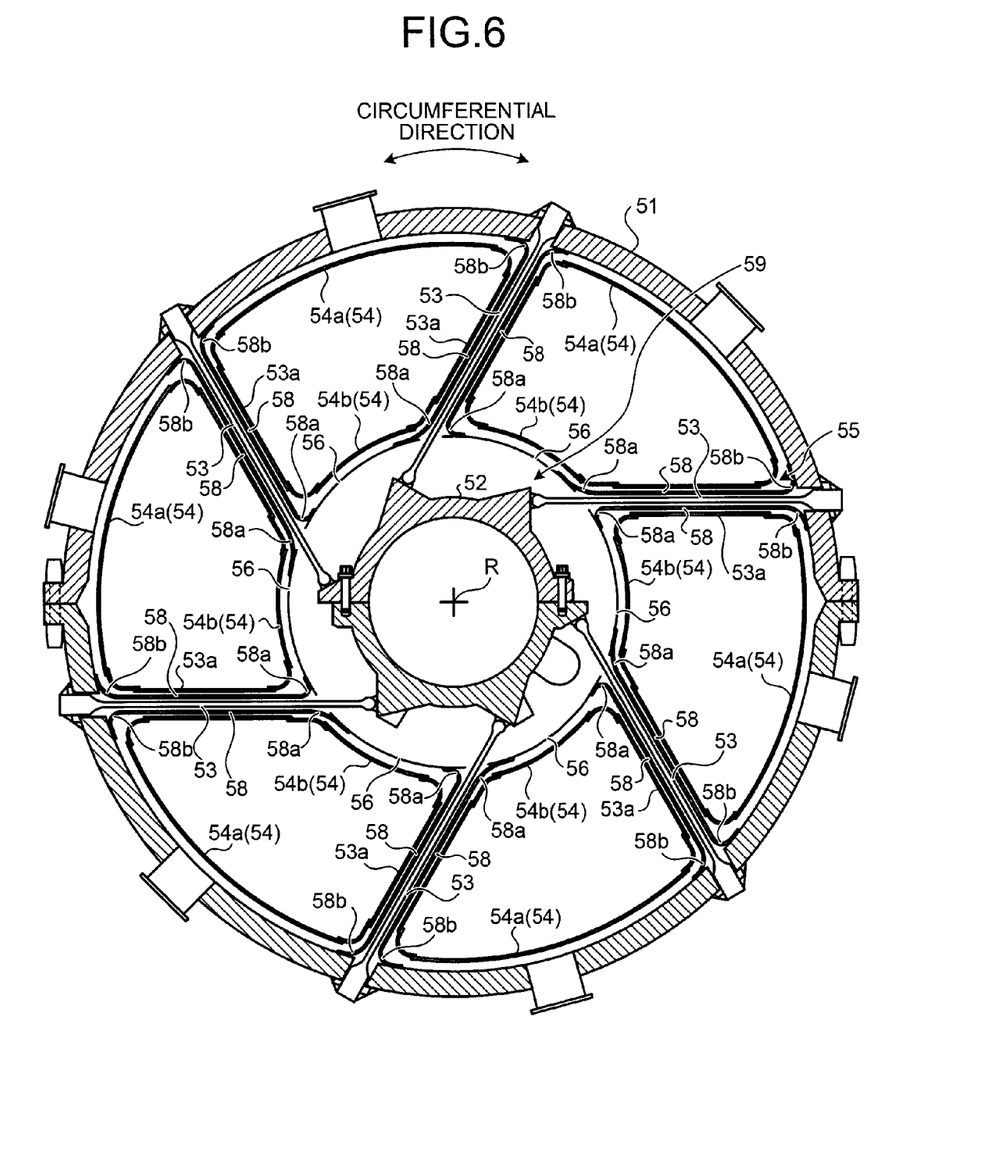
FIG. 6 is a schematic of the downstream side of the turbine illustrated in FIG. 5, when viewed from the axial direction.

Another embodiment of the structure in which a partition wall is provided will now be described. FIG. 5 is another schematic of the downstream side of the turbine of the gas turbine illustrated in FIG. 1. FIG. 6 is a schematic of the downstream side of the turbine illustrated in FIG. 5, when viewed from the axial direction. In this alternative embodiment, the same portions as those in the embodiment described above are denoted by the same reference numerals, and the descriptions thereof are omitted.

As illustrated in FIGS. 5 and 6, the partition wall 56 is supported by a partition wall supporting member 58 in the exhaust chamber 34. The partition wall supporting member 58 is formed in a tubular shape in the strut cover 53a, so as to surround the outer periphery of each of the struts 53. One end side 58a of the partition wall supporting member 58 opened in a tubular shape is fixed to the partition wall 56. Another end side 58b of the partition wall supporting member 58 opened in a tubular shape is fixed to the casing wall 51. The partition wall supporting member 58 has flexibility.

In such an exhaust chamber 34 at the downstream side of the turbine 3, combustion gas used to rotate and drive the rotor 4 passes through the diffuser unit 54, in other words, between the outer diffuser 54a and the inner diffuser 54b, and is converted into static pressure. The temperature of the diffuser unit 54 is increased by being heated by the combustion gas. Accordingly, the diffuser unit 54 and the struts 53 are cooled by sending cooling air into the cooling chamber 55 by the cooling fan (not illustrated) provided at the exterior of the casing wall 51, and introducing the cooling air through the outer diffuser 54a, the strut cover 53a, and the inner diffuser 54b. The cooling air is discharged into the exhaust chamber 34 after flowing through the partition wall 56 and the inner diffuser 54b.

Heat exchange is carried out while the cooling air flows through the outer diffuser 54a, the strut cover 53a, and the inner diffuser 54b. By the time the cooling air reaches the inner diffuser 54b, the temperature of the cooling air is increased so as to heat the lubricating oil of the bearing part 42 in the bearing case 52. In the gas turbine according to another present embodiment, the cooling air used to cool the inner diffuser 54b is prevented from flowing to the side of the bearing case 52, by providing the partition wall 56 that isolates the inner diffuser 54b from the bearing case 52. As a result, the diffuser unit 54, the struts 53, and the strut covers 53a are cooled, thereby preventing the bearing part 42 of the rotor 4 from being heated by the cooling air whose temperature has risen.

Ventilation air is supplied to the exhaust tunnel 59 formed between the bearing case 52 and the partition wall 56, from the downstream side of the gas turbine. The ventilation air prevents the temperature of the bearing case 52 from being excessively increased. The ventilation air is then discharged into the exhaust chamber 34 as the cooling air.

By providing the partition wall 56, it is possible to independently ventilate a space in which the bearing case 52 is accommodated. It is also possible to independently manage the amount of ventilation air around the bearing case 52 and the amount of cooling air in the cooling chamber.

In the gas turbine according to another embodiment, the struts 53 are extendedly provided in the tangential direction of the bearing case 52. Accordingly, even if the struts 53 are expanded or contracted by the changes in temperature, the position of the rotor 4 is maintained because the bearing case 52 rotates about the axial center R of the rotor 4. Relative to such expansion and contraction of the struts 53, the partition wall 56 follows the expansion and contraction of the struts 53 because the flexible partition wall supporting member 58 is bent. Accordingly, the position of the partition wall 56 is maintained. Because the flexible strut cover 53a is bent, the diffuser unit 54 follows the expansion and contraction of the struts 53, thereby maintaining the position of the diffuser unit 54.

In the conventional gas turbines illustrated in Patent Document 1 and Patent Document 2 described above, a partition wall is to be arranged between the inner peripheral diffuser and the inner peripheral casing to provide the partition wall 56 as the gas turbine according to another embodiment. However, to obtain a space for accommodating the partition wall, the inner peripheral diffuser must be moved outward, or the design must be changed to accommodate the partition wall by reducing the thickness of the inner peripheral casing. If the inner peripheral diffuser is moved outward, a space between the inner peripheral diffuser and the outer peripheral diffuser is reduced, thereby increasing the flow velocity at an outlet portion from which combustion gas is released to the atmosphere. Accordingly, the pressure loss at the outlet portion is increased. If the outer peripheral diffuser is also moved outward, the size of the gas turbine is increased. If the thickness of the inner peripheral casing is reduced, the strength of the inner peripheral casing is reduced. In the conventional gas turbines disclosed in Patent Document 1 and Patent Document 2, the outer peripheral casing, the inner peripheral casing, and the struts must be formed in a rigid structure. Consequently, if the rigidity of the inner peripheral casing is reduced, the strength of the outer peripheral casing and the struts must be changed.

On the other hand, in the gas turbine according to another embodiment, the partition wall 56 can be disposed in the structure in which the struts 53 are extendedly provided in the tangential direction of the bearing case 52 without changing the basic design of the structure, and without reducing the strength or effect.

In the partition wall supporting member 58 of another embodiment, the position of the partition wall 56 may be maintained, by allowing the partition wall supporting member 58 to follow the expansion and contraction of the struts 53, by dividing into the one end side 58a and the other end side 58b, by providing the sealing unit 57c as the partition wall supporting member 57 in the embodiment described above, and by movably providing the one end side 58a and the other end side 58b relative to the extending direction of the strut 53.

Industrial Applicability

In this manner, the gas turbine according to the present invention is suitable for preventing the bearing part of the rotor from being heated due to the temperature increase of the cooling air used to cool the diffuser unit of the turbine.

The invention claimed is:

1. A gas turbine comprising:
a casing wall in a cylindrical shape that forms an outer shell of a downstream side of a turbine;
a bearing case that supports a bearing part of a rotor in the casing wall;
a plurality of struts that are provided in a circumferential direction of the bearing case and extend in a tangential direction of the bearing case to couple the casing wall and the bearing case;
a diffuser unit that includes an outer diffuser provided along an inner periphery of the casing wall and an inner diffuser provided along an outer periphery of the bearing case;
a partition wall that is formed between the bearing case and the inner diffuser and covers the outer periphery of the bearing case;
a cooling chamber in which the outer diffuser and the inner diffuser are coupled by a strut cover for covering each of the struts, and that is led to a portion between the casing wall and the outer diffuser, a portion between the partition wall and the inner diffuser, and an inside of the strut cover, wherein
the partition wall has the struts penetrating therethrough and isolates cooling medium in the cooling chamber from cooling medium around the bearing case; and,
a partition wall supporting member one end side of which is fixed to the bearing case and another end side of which is fixed to the partition wall, that is provided in an extending direction of each of the struts, and that includes a sealing unit dividing the one end side and the other end side, and that is slidably provided in the extending direction of the struts, while maintaining airtightness between the one end side and the other end side.

2. A gas turbine comprising:
a casing wall in a cylindrical shape that forms an outer shell of a downstream side of a turbine;
a bearing case that supports a bearing part of a rotor in the casing wall;
a plurality of struts that are provided in a circumferential direction of the bearing case and extend in a tangential direction of the bearing case to couple the casing wall and the bearing case;
a diffuser unit that includes an outer diffuser provided along an inner periphery of the casing wall and an inner diffuser provided along an outer periphery of the bearing case;
a partition wall that is formed between the bearing case and the inner diffuser and covers the outer periphery of the bearing case;
a cooling chamber in which the outer diffuser and the inner diffuser are coupled by a strut cover for covering each of the struts, and that is led to a portion between the casing wall and the outer diffuser, a portion between the partition wall and the inner diffuser, and an inside of the strut cover, wherein
the partition wall has the struts penetrating therethrough and isolates cooling medium in the cooling chamber from cooling medium around the bearing case; and,
a partition wall supporting member that surrounds an outer periphery of each of the struts, one end side of which is fixed to the partition wall and another end side of which is fixed to the casing wall, and that is provided in an extending direction of the struts.

* * * * *